United States Patent [19]
Murphy

[11] 3,757,229
[45] Sept. 4, 1973

[54] THERMAL POLLUTION MONITORING DEVICE
[75] Inventor: John Brian Murphy, Pacific Palisades, Calif.
[73] Assignee: The Bissett-Berman Corporation, Santa Monica, Calif.
[22] Filed: June 17, 1970
[21] Appl. No.: 47,049

[52] U.S. Cl. ............... 328/1, 307/310, 324/94, 328/3
[51] Int. Cl. ............................................. G01k 7/00
[58] Field of Search ................. 323/9; 324/94; 328/1, 3; 307/310, 288

[56] References Cited
UNITED STATES PATENTS
| | | | |
|---|---|---|---|
| 3,287,975 | 11/1966 | Mason et al. | 307/310 |
| 3,206,937 | 9/1965 | Walisch et al. | 328/3 |
| 3,067,340 | 12/1962 | Hodges | 307/288 |
| 3,319,086 | 5/1967 | Yee | 307/288 |

Primary Examiner—Harold A. Dixon
Attorney—Smyth, Roston & Pavitt

[57] ABSTRACT

A device for monitoring a particular function such as temperature for determining when the function is above a threshold level. A sensor responsive to the particular function being monitored provides a variable electrical signal in response to variations of the particular function. An electrical circuit is coupled to receive the variable electrical signal at an input. The electrical circuit is in a first state in response to the variable electrical signal above the threshold level and is in a second state in response to the variable electrical signal below the threshold level. A first electrolytic cell is coupled to the input of the electrical circuit and is responsive to the variable electrical signal when the electrical circuit is in the first state. A second electrolytic cell is coupled to the output of the electrical circuit and is responsive to a constant signal when the electrical circuit is in the first state.

8 Claims, 1 Drawing Figure

PATENTED SEP 4 1973          3,757,229
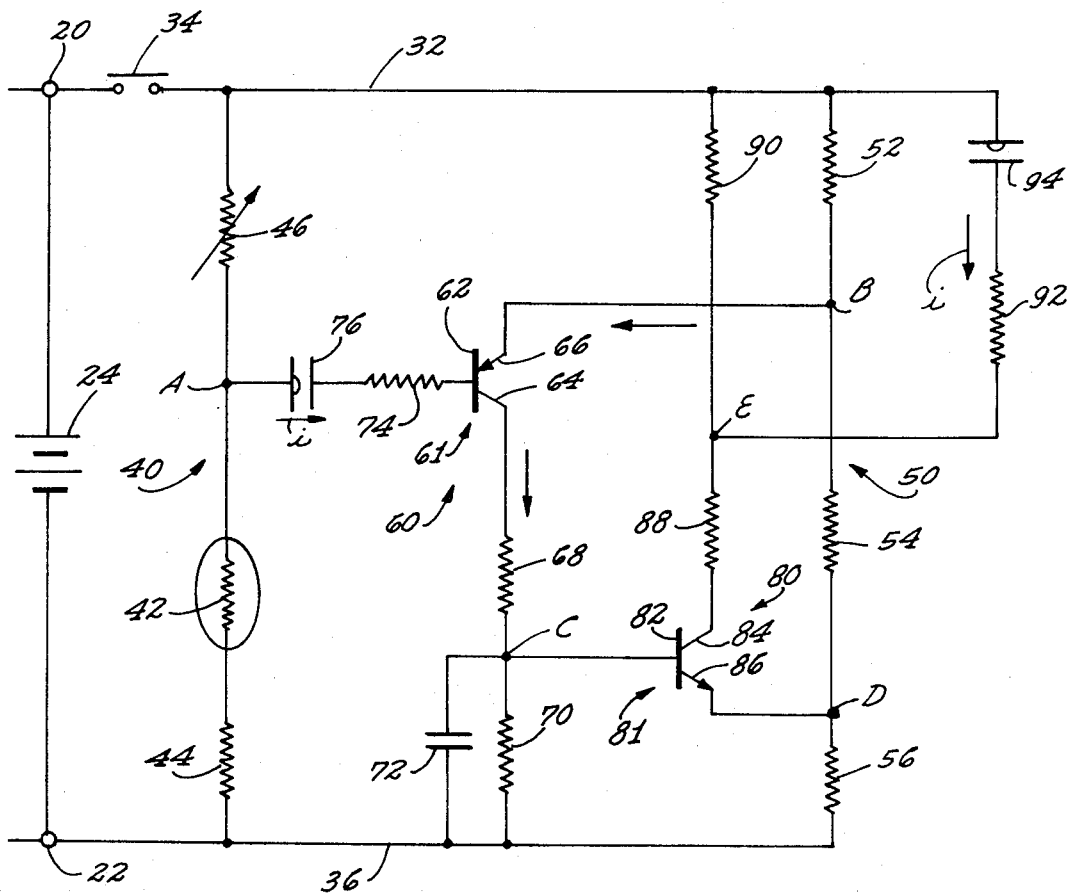
INVENTOR.
John Brian Murphy
ATTORNEYS

THERMAL POLLUTION MONITORING DEVICE

BACKGROUND OF THE INVENTION

1. Field of the Invention

This invention relates in general to a monitoring device and more particularly to a monitoring device for totalizing a particular function above a threshold level over an interval of time.

2. Description of the Prior Art

In certain applications, it is desirable to determine the total amount of a particular function that has occurred above a particular level and the average function that has occurred above the particular level. In a particular application, it may be desirable to monitor ambient temperature and to determine the average temperature above a particular temperature over an interval of time. For example, under certain conditions, the pollution of water may be reflected by an increase in the temperature of the water or an increase in the temperature of the water may itself be considered to be a form of water pollution. For example, when the temperature of the water increases above a particular threshold level, the water may no longer be habitable by certain marine life. Accordingly, by monitoring the temperature of the water, the pollution may be monitored.

One way that a function such as temperature can be monitored is to periodically read the function from a monitoring device, such as a thermometer, and manually record the readings. This physical method is time consuming and makes it difficult to determine an average value of temperature above a particular level.

Another method of monitoring functions such as temperature is to place a sensor such as a temperature sensing transducer within the environment to be monitored and to continuously record the transducer output. The transducer provides an electrical signal that varies in accordance with variations in the temperature of the water. Consequently, a monitor such as a pen stylus X-Y or graph recorder can be coupled to receive the output of the transducer for continually plotting variations in the electrical current provided by the transducer and hence the function being monitored.

The use of sophisticated graphic recording equipment provides a quantity of redundant information in applications where it is desired to know the total that a particular function is above a particular threshold level and/or the average value of the function above the particular threshold level. If a graph recording method is used, it is necessary to eliminate the redundant information from the desired information. Furthermore, if the average value of the function above the threshold level is desired, it would be necessary to integrate and average all the periods of time the function was above the threshold level. Consequently, in certain applications it is desirable to provide an economical easy to use monitor for monitoring particular functions, such as temperature, that are above a threshold level. Furthermore, it is desired to provide a monitor for determining the average value of the quantity above a desired threshold level over an interval of time.

SUMMARY OF THE INVENTION

In the present invention, an electrical circuit having an input is coupled to receive an input signal provided by a transducer. The input signal varies in accordance with variations of a function being monitored by the transducer. Input signal levels above a particular threshold level cause the electrical circuits to be in a first state. Input signal levels below the particular threshold level cause the electrical circuit to be in a second state. A first electrolytic cell is coupled to the input of the electrical circuit and is responsive to the electrical signal when the electrical circuit is in the first state. The electrolytic cell totalizes the electrical signal above the threshold level. A second electrolytic cell may be coupled to an output of the electrical circuit when the electrical circuit is in the first state. The second electrolytic cell is independent of variations in the electrical signal and receives a constant signal to provide a means for determining the total time the electrical circuit is in the first state.

The above and other objects, features and advantages of the present invention will become more apparent with reference to the following detailed description, taken in conjunction with the accompanying drawing.

Referring now to the single disclosed drawing, there is shown a schematic diagram of a monitoring device of the present invention. The monitoring device includes a first terminal 20 or a first connection means and a second terminal 22 or a second connection means that provide a means for coupling the monitoring device to a battery 24. A first lead 32 is coupled to the first terminal 20 through a switch 34. A second lead 36 is directly coupled to the second terminal 22. When the switch 34 is closed to complete the circuit of the first lead 32, a voltage potential is developed between the lead 32 and the lead 36.

The schematic diagram includes a first voltage divider 40 and a second voltage divider 50. The first voltage divider 40 includes a sensor 42, a resistor 44 and a resistor 46 connected in series circuit relationship. The first voltage divider 40 is coupled between the first lead 32 and the second lead 36. The resistor 46 is illustrated as being a variable resistor which can be adjusted between distinct values of resistance for varying the total resistance of the voltage divider 40. The sensor 42 can be any sensor for sensing the particular function being monitored. For example, the sensor 42 may be a thermistor if the function monitored is temperature. Thermistors have a high negative temperature coefficient of resistance and operate such that the resistance of the thermistor decreases as ambient temperature increases. Consequently, the resistance of the first voltage divider 40 will also be varied by variations in the ambient temperature to the sensor 42.

The second voltage divider 50 includes a resistor 52, a resistor 54, and a resistor 56, coupled in series circuit relationship. The second voltage divider 50 is coupled between the lead 32 and the lead 36 and in parallel circuit relationship with the first voltage divider 40.

A first transistor circuit 60 is coupled between the first voltage divider 40 and the second voltage divider 50. The first transistor circuit 60 includes a transistor 61 having a base 62, a collector 64, and an emitter 66. A resistor 74 and an electrolytic cell 76 are coupled in series circuit relationship between the base 62 of the transistor 61 and a tie point A between the resistor 46 and the thermistor 42. The emitter 66 of the transistor 61 is directly coupled to a tie point B between the resistor 52 and the resistor 54 of the second voltage divider 50. The collector 64 of the transistor 61 is coupled to the lead 36 by a resistor 68 and a resistor 70 which are coupled in series circuit relationship. A bypass capacitor 72 is coupled between the junction of the resistors 68 and 70 and the lead 36 so that the capacitor 72 is in parallel circuit relationship with the resistor 70.

The electrolytic cell 76 may be of the type shown in U. S. Pat. No. 3,423,648, invented by Martin Mintz and having the same assignee as the present case, and provides a storage of information by the physical transfer of an active integral from a first electrode to a second electrode in proportion to the value of the current through the electrolytic cell and the time the current flows through the electrolytic cell.

The first voltage divider 40 operates to provide a bias voltage to the base 62 of the transistor 61. The resistance of the resistor 46 and the resistance of the thermistor 42 are selected to provide a bias voltage at the tie point A that maintains the transistor 61 in cutoff below a particular level and to operate the transistor 61 in the active or saturated region above a particular level. If the voltage at the tie point A is below the particular level, substantially no base current will flow through the base 62 of the transistor 61 and through the electrolytic cell 76. However, if the voltage at the tie point A is decreased below the particular level, the transistor 61 will go into the active or saturated region of operation by means of a base current through resistor 74 and the electrolytic cell 76, and resistor 44 into the base 62. The amplitude of the base current will be proportional to the change in the voltage at the tie point A. So long as the base-emitter junction of transistor 61 is forward biased, any variations in the voltage at the tie point A will produce a proportional and corresponding change in the current through the electrolytic cell 76. Resistor 44 is provided to cause a more linear change in voltage at tie point A with temperature.

Consequently, by changing the voltage at the tie point A, the transistor 61 can be operated in either cutoff or in the saturated region. The voltage at the tie point A can be varied by either changing the resistance of the resistor 46 or by changes in the resistance of the thermistor 42. Therefore, if it is desired to monitor temperatures above a particular temperature threshold, the resistor 46 can be preset so that as the temperature increases, the resistance of the thermistor 42 decreases until the temperature is at the particular temperature threshold. With the temperature below the particular threshold, the transistor 61 is cut off. However, when the temperature increases above the particular threshold level, the transistor 61 goes into the active or saturated region of operation with its base-emitter junction forward biased. Consequently, any further variations in the temperature, and hence the resistance of the thermistor 42, will produce corresponding variations in the base current and the current through the electrolytic cell 76. Any time the temperature decreases below the particular temperature threshold, the resistance of the thermistor 42 increases to a level to cause the transistor 61 to cut off.

The variations in current through the electrolytic cell 76 are directly related to variations in the temperature above the particular threshold level. Accordingly, the electrolytic cell 76 provides for the storage of the integral of the current-time product of the current through the electrolytic cell 76 for the period of time above the threshold level.

A second transistor circuit 80 includes a transistor 81, a resistor 88, and a resistor 90. The transistor 81 has a base 82, a collector 84, and an emitter 86. The base 82 of the transistor 81 is directly coupled to a tie point C between the resistor 68 and the resistor 70. The emitter 86 of the transistor 81 is directly coupled to a tie point D between the resistor 54 and the resistor 56. The collector 84 of the transistor 81 is coupled to the lead 32 by a voltage divider formed by the resistor 88 and the resistor 90, coupled in series circuit relationship with one another.

The base 82 of the transistor 81 is biased by a voltage developed at the tie point C when the transistor 61 is on or conducting. Accordingly, since the transistor 61 is cut off until the particular function being monitored is above a particular threshold level, the transistor 81 will be cut off until the particular function being monitored is above the particular threshold level.

When the transistor 61 conducts in the active region, sufficient current is supplied to the base 82 of the transistor 81 by the tie point C to drive the transistor 81 into saturation. Consequently, when the transistor 61 is in the active or saturated region the transistor 81 is in saturation. When the transistor 61 is in cut-off, the transistor 81 is in cut-off.

When transistor 81 is in saturation, the voltage at its emitter 86 rises because of the increased current through resistor 56. This voltage increase is coupled to the tie point B through resistors 52 and 54. The voltage increase at point B causes the emitter 66 of transistor 61 to also increase in voltage. Thus, transistor 61 is abruptly driven into the saturated region by this positive feedback, effecting a definite threshold point.

An output circuit including a resistor 92 and an electrolytic cell 94 is coupled between the lead 32 and a tie point E formed by the resistor 88 and the resistor 90. The electrolytic cell 94 may be of the same type as the electrolytic cell 76. A current flows through the electrolytic cell 94 and the resistor 92 when the transistor 81 is on or in conduction and substantially no current flows through the resistor 92 and the electrolytic cell 94 when the transistor 81 is cut off.

When the transistor 81 is conducting, a current flows through the electrolytic cell 94, through the resistor 92, to the tie point E, through the resistor 88, the transistor 81, through the resistor 56, to the lead 36. The current through the electrolytic cell 94 will be substantially constant since the transistor 81 is in saturation which effectively couples the collector 84 to the emitter 86. Therefore, the potential developed between the tie point E and the lead 32 determines the current through the electrolytic cell 94.

Operationally, the monitoring device can be preset to monitor a particular function such as temperature by varying the resistance of the resistor 46 to set the base voltage at the base 62 of the transistor 61 to cut-off. As ambient temperature increaes, the resistance of the thermistor 42 decreases causing the bias voltage to decrease. When the bias voltage at the tie point A decreases to a voltage level corresponding to a particular threshold level, the transistor 61 begins to operate in the active region to provide an increase in current through the electrolytic cell 76 in response to further decrease in resistance in the thermistor 42 for totalizing the current therethrough.

When the transistor 61 is in the active or saturated region, the transistor 81 is in saturation to provide a constant current through the electrolytic cell 94. Consequently, the electrolytic cell 76 provides a total storage that is directly related to the integral of the current-time product. The average time the temperature was above the particular threshold level may be determined by dividing the total time derived by the electrolytic cell 94 into the total quantity determined by the electrolytic cell 76.

While the salient features of the present invention have been illustrated and described with respect to a particular embodiment, it should be readily apparent that modifications can be made within the spirit and scope of the invention.

What is claimed is:

1. A monitoring device, comprising:
an electrical circuit, the electrical circuit being responsive to a variable amplitude input signal above a particular amplitude for providing a variable electrical signal in response to the variable amplitude input signal and with the electrical circuit providing a constant electrical signal for the period of time the variable amplitude input signal is above the particular amplitude;
a first electrolytic cell coupled to the electrical circuit and being responsive to the variable electrical signal for totalizing the variable electrical signal, and a second electrolytic cell coupled to the electrical circuit and being responsive to the constant electrical signal for totalizing the constant electrical signal.

2. The monitoring device of claim 1 that further includes:
a transducer coupled to the input of the electrical circuit for varying the amplitude of the variable amplitude input signal in response to variations of a particular function.

3. A monitoring device for monitoring a particular function above a threshold level, comprising:
a sensor being responsive to variations of the particular function for providing a variable amplitude input signal having an amplitude related to the particular function;
an electrical circuit coupled to the sensor and being responsive to the variable amplitude input signal for providing at least a first electrical signal during intervals of time the variable amplitude input signal exceeds the threshold level, the first electrical signal having an amplitude related to the amplitude of the variable amplitude input signal, and
an electrolytic cell coupled to receive the first electrical signal for providing a summation of the first electrical signal, the summation of the first electrical signal being related to the summation of the particular function above the threshold for a period of time.

4. The device of claim 3 wherein the sensor is a thermistor.

5. The device of claim 3 wherein the electrical circuit provides a second constant electrical signal during intervals of time the variable amplitude input signal exceeds the threshold level and additionally includes a second electrolytic cell for receiving the second constant electrical signal for providing a summation of the second constant electrical signal, the summation of the second constant electrical signal being related to the period of time the particular function is above the threshold value.

6. A monitoring device for totalizing a particular quantity above a threshold level, comprising:
a sensor responsive to the particular quantity for providing a variable amplitude input signal having an amplitude related to the particular function,
an electrical circuit coupled to the sensor and being responsive to the variable amplitude input signal for providing a first electrical signal and a second electrical signal when the variable amplitude input signal exceeds the threshold level, the first electrical signal having a variable amplitude related to the amplitude of the variable amplitude input signal, the second electrical signal having a substantially constant amplitude,
a first electrolytic cell being responsive to the first electrical signal for totalizing the first electrical signal during any interval of time the variable amplitude input signal exceeds the threshold level, and
a second electrolytic cell being responsive to the second electrical signal for the totalizing of the second electrical signal during any integral of time the variable amplitude input signal exceeds the threshold level.

7. The device of claim 6 wherein the sensor is a thermistor.

8. A device for monitoring a particular function above a particular threshold level, the device having a first electrolytic cell that totalizes a first electrical signal related to the function above the particular threshold level and a second electrolytic cell that totalizes a second electrical signal related to the particular function above the particular threshold level, comprising:
a sensor being responsive to a particular function for providing a variable amplitude input signal having an amplitude related to the particular function;
an electrical circuit coupled to the sensor and being responsive to the variable amplitude input signal for providing the first electrical signal and the second electrical signal when the variable amplitude input signal exceeds the threshold level, the first electrical signal having a variable amplitude related to the amplitude of the variable amplitude input signal, the second electrical signal having substantially a constant amplifier.

* * * * *